(12) United States Patent
Andersen

(10) Patent No.: US 10,525,942 B2
(45) Date of Patent: Jan. 7, 2020

(54) VEHICLE STABILIZER AND/OR LEVELER SPACER

(71) Applicant: Andersen Manufacturing, Inc., Idaho Falls, ID (US)

(72) Inventor: Ryan B. Andersen, Ammon, ID (US)

(73) Assignee: Andersen Manufacturing, Inc., Idaho Falls, ID (US)

( * ) Notice: Subject to any disclaimer, the term of this patent is extended or adjusted under 35 U.S.C. 154(b) by 123 days.

(21) Appl. No.: 15/874,441

(22) Filed: Jan. 18, 2018

(65) Prior Publication Data

US 2019/0217825 A1  Jul. 18, 2019

(51) Int. Cl.
*B60S 9/02* (2006.01)
*B60S 9/22* (2006.01)

(52) U.S. Cl.
CPC .. *B60S 9/02* (2013.01); *B60S 9/22* (2013.01)

(58) Field of Classification Search
CPC ..... B60T 3/00; B60S 9/02; B60S 9/04; F16M 2200/08
See application file for complete search history.

(56) References Cited

U.S. PATENT DOCUMENTS

| | | | | |
|---|---|---|---|---|
| 2,221,203 A * | 11/1940 | Sandberg | ................ | B66F 13/00 248/158 |
| 4,073,454 A * | 2/1978 | Sauber | ..................... | B23Q 1/54 248/188.2 |
| D304,575 S * | 11/1989 | Batzel | ........................... | D34/31 |
| 5,046,587 A * | 9/1991 | Jones | ........................ | B60T 3/00 188/32 |
| 8,739,941 B2 | 6/2014 | White et al. | | |
| 10,228,089 B1 * | 3/2019 | Norris | .................... | F16M 11/22 |
| 2002/0027354 A1 | 3/2002 | Holly | | |
| 2015/0028177 A1 * | 1/2015 | Vargas | ...................... | B60S 9/02 248/542 |
| 2016/0325974 A1 * | 11/2016 | Wilson | ...................... | B60S 9/04 |

OTHER PUBLICATIONS https://rvsnappad.com/collections/snappad; SnapPad XTRA & PRIME (2018).

* cited by examiner

*Primary Examiner* — Drew J Brown
(74) *Attorney, Agent, or Firm* — Parsons Behle & Latimer

(57) ABSTRACT

A vehicle leveler spacer and method of using the vehicle leveler spacer that may be selectively attached to a retracted leveler of a vehicle, such as a trailer or motor home. The spacer at least partially supports the vehicle upon extension of the leveler to the ground. The spacer includes at least one connector to selectively connect the spacer to the retracted leveler. The connector may be a magnet, strap, clamp, or another mechanical connector. The top surface of the spacer may include a rim along its perimeter configured to retain a pad of a leveler. The spacer may form a gap between the bottom surface and a supporting surface, e.g. the ground, when the spacer is connected to a retracted leveler. The connectors enable the spacer to be quickly attached or removed from a retracted leveler of a vehicle.

15 Claims, 3 Drawing Sheets

VEHICLE STABILIZER AND/OR LEVELER SPACER

BACKGROUND

Field of the Disclosure

The embodiments described herein relate to a vehicle stabilizer and/or leveler (hereinafter referred to as a leveler) spacer and method of using the vehicle leveler spacer. The spacer may be selectively attached to a retracted leveler of a vehicle, such as a trailer or motor home, to at least partially support the vehicle upon extension of the leveler to the ground or support surface.

Description of the Related Art

Various vehicles include a system of stabilizers and/or levelers (hereinafter referred to as a leveler) that may be selectively lowered to level and/or support the vehicle. For example, recreational vehicles, such as motor homes and fifth wheels, typically have a set of levelers positioned around the perimeter of the vehicle. When the motor home or fifth wheel is stopped at a location, the levelers are extended to engage the ground, or supporting structure, such as a driveway, to provide support to the vehicle. Additionally, the levelers may be used to level the vehicle.

In some instances, blocks may be positioned on the ground below the retracted levelers. The blocks may be used to shorten the distance each leveler needs to extend to the ground and/or may be used in the instance that the ground or supporting structure is not level. Although it is intended to align the block with an extended leveler, it may be necessary to adjust the block as the leveler is extended. Such adjustment may potentially be unsafe if a hand or finger is inadvertently placed between the block and the leveler, as the leveler extends. Additionally, the vehicle may include a system that extends the levelers at the same time or in rapid succession, which may make it difficult to ensure all of the blocks align with a leveler as the levelers on the vehicle extend to engage the blocks.

Other disadvantages may exist.

SUMMARY

The present disclosure is directed to a vehicle leveler spacer and method of using the vehicle leveler spacer, the spacer may be selectively attached to a retracted leveler of a vehicle, such as a trailer or motor home, to at least partially support and/or level the vehicle upon extension of the leveler to the ground or support surface.

An embodiment of the present disclosure is a leveler spacer comprising a top surface, a rim along a perimeter of the top surface with the rim extending a distance from the top surface. The spacer includes a bottom surface and a sidewall connected to the top surface and the bottom surface. The spacer includes at least one connector configured to selectively attach the leveler spacer to a retracted leveler.

The spacer may form a gap between the bottom surface and a supporting surface, e.g. the ground, when the spacer is connected to a retracted leveler. The spacer may be configured to support the leveler on the supporting surface when the leveler is extended. The connector may be at least one magnet configured to magnetically connect the spacer to a pad of the leveler. The rim on the top surface of the spacer may be configured to enclose the pad of the leveler when the spacer is connected to the leveler.

The connector may be at least two magnets configured to magnetically connect the spacer to the pad of the leveler. The top surface of the spacer may include a circular depression or recess that is substantially located in the center of the top surface. The spacer may include a cavity that is enclosed by the sidewall between the top surface and the bottom surface and may include a plurality of structural members connected to the sidewall within the cavity. The bottom surface of the spacer may comprise a flange that extends away from the sidewall. The connector may comprise at least one strap configured to selectively attach the spacer to a retracted leveler. The connector may comprise at least one clamp configured to selectively attach the spacer to a retracted leveler. The connector may selectively enable the spacer to be removed from a retracted leveler of a trailer to enable the trailer to be moved.

An embodiment of the present disclosure is a method of supporting a vehicle. The method comprises connecting a spacer to a bottom of a retracted leveler, wherein a gap is created between a bottom surface of the spacer and a supporting surface. The method includes extending the leveler until the bottom surface of the spacer is on the supporting surface, wherein the spacer is positioned between the supporting surface and the bottom of the leveler and wherein the spacer supports at least a portion of the vehicle.

The spacer may be connected to the bottom of the retracted leveler by magnetically connecting the spacer to the bottom of the retracted leveler. The spacer may be connected to the bottom of the retracted leveler by at least one strap or clamp. The method may include selectively retaining a pad of the leveler on a top surface of the spacer with a rim along a perimeter of the top surface.

An embodiment of the present disclosure is a vehicle support system comprising a plurality of spacers each being configured to be selectively attached to a retracted leveler of a vehicle. Each spacer comprises a top surface, a rim along a perimeter of the top surface that extends a distance from the top surface, and a bottom surface. The spacers comprise a sidewall connected to the top surface and the bottom surface and at least one connector configured to selectively attach the spacer to a retracted leveler of a vehicle.

Two of the spacers may be stacked together to provide a support for a single leveler. The connector may magnetically connect the spacer to the retracted leveler of the vehicle. The connector may mechanically connect the spacer to the retraced leveler of the vehicle.

Figure 1:
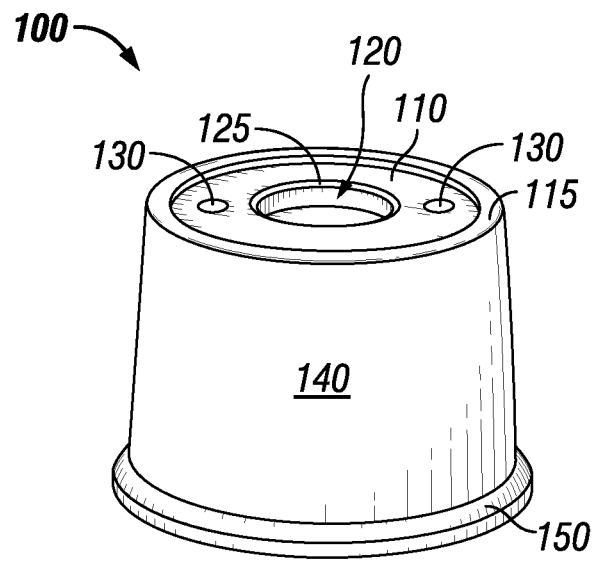
FIG. 1 shows an isometric top view of an embodiment of a vehicle leveler spacer.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the invention as defined by the appended claims.

DETAILED DESCRIPTION

FIG. 1 shows an embodiment of a vehicle leveler spacer 100, also referred to as a spacer. The spacer 100 may be used to provide support between a leveler 20 (shown in FIG. 3) of a vehicle, such as trailer 10 (shown in FIG. 3), and a supporting surface, such as the ground, as discussed herein. The spacer 100 includes a top surface 110 that is enclosed by a rim, or ridge, 115 along the perimeter of the top surface 110 that extends from the top surface 110. The rim 115 is configured to retain a pad 25 (shown in FIG. 3) of a leveler 20, as would be appreciated by one of ordinary skill in the art having the benefit of this disclosure. In other words, the rim 115 may be configured to prevent the pad 25 of a leveler 20 from sliding off the top surface 110 of the spacer 100.

The spacer 100 includes a sidewall 140 that connects the top surface 110 to a bottom portion 150 of the spacer 100. The bottom portion 150 of the spacer 100 may be formed as a flange or rim that extends outward away from the sidewall 140, as shown in FIG. 1. The top surface 110, rim 115, sidewall 140, and bottom portion 150 are shown as circular in shape for illustrative purposes, and the shape, size, and/or configuration of the top surface 110, rim 115, sidewall 140, and/or bottom portion 150 may be varied depending on the application as would be appreciated by one of ordinary skill in the art having the benefit of this disclosure. The spacer 100 may include a depression or recessed surface 120 in the top surface 110. A rim or ridge 125 along the depression 120 may be configured to retain a portion of a leveler within the recess or depression 120.

The spacer 100 may be configured to reduce the distance that the leveler 20 has to extend to the ground or supporting surface while still providing stability to the vehicle. Reducing the travel distance of the leveler 20 may help to reduce the wear on the leveler 20 due to repeated use. Thus, the sidewall 140 of the spacer 100 should be configured to have a length that reduces the travel of the leveler by a significant amount, such as by at least 20%. In some embodiments, the length of the sidewall 140 of the spacer 100 may be configured to reduce the travel of the leveler by more than 20%. The sidewall 140 of the spacer 100 may have a length of approximately eight (8) inches to reduce the travel of the leveler 20 while still providing stability to the vehicle. In some embodiments, the length of the sidewall 140 may be at least two (2) inches or more. A sidewall 140 having a length of less than two (2) inches may not adequately reduce the travel of the leveler. In some embodiments, the length of the sidewall 140 may be greater than eight (8) inches. The length of the sidewall 140 of the spacer 100 may be varied depending on the application as would be appreciated by one of ordinary skill in the art having the benefit of this disclosure.

The length of the sidewall 140 of the spacer 100 may include the distance that the rim, or ridge, 115 extends from the top surface 110. In order to provide adequate stability to the vehicle while adequately reducing the travel of the leveler 20, the overall length of the sidewall 140 should be much larger than the distance that the rim, or ridge, 115 extends from the top surface 110. For example, in an embodiment the length of the sidewall 140 may be five (5) times longer than the distance that the rim, or ridge, 115 extends from the top surface 110. In another example, the length of the sidewall 140 may be more than ten (10) times longer than the distance that the rim, or ridge, 115 extends from the top surface 110. In another embodiment, the distance that the rim, or ridge, 115 extends from the top surface 110 may be less than ½ (0.5) of an inch whereas the length of the sidewall 140 may be approximately eight (8) inches.

Figure 3:
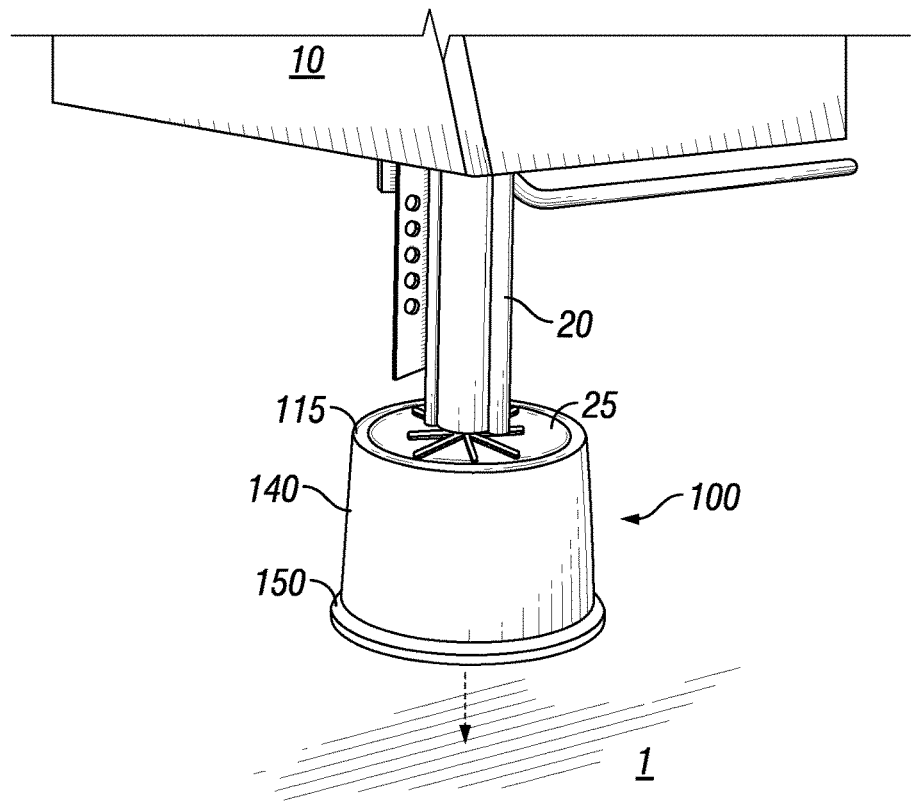
FIG. 3 shows an embodiment of a vehicle leveler spacer selectively connected to a retracted trailer leveler.

The spacer 100 includes at least one connector configured to selectively attach or connect the spacer 100 to a retracted vehicle leveler, such as a trailer leveler 20 (shown in FIG. 3). In other words, the at least one connector is used to attach the spacer 100 to a leveler before the leveler is lowered or extended to level and/or provide support for the vehicle, such as a trailer 10 (shown in FIG. 3). In one embodiment, the connector may be a magnet 130 positioned adjacent or embedded in the top surface 110 of the spacer 100. The spacer 100 of FIG. 1 includes two magnets 130 that may be used to selectively attach the spacer 100 to a retracted leveler 20, as discussed herein. FIG. 1 shows two magnets 130 for illustrative purposes and the number, size, location, and/or configuration of the magnets 130 may be varied depending on the application as would be appreciated by one of ordinary skill in the art having the benefit of this disclosure. Alternatively, the connectors, which may be magnets 130, may be located on a portion of the leveler pad 25 or leveler 20 to selectively connect the spacer 100 to a retracted leveler 20 as would be appreciated by one of ordinary skill in the art having the benefit of this disclosure. Various connectors may be used to selectively connect the spacer 100 to a retracted leveler 20 of a vehicle, such as, but not limited to, a trailer, a recreational vehicle, or a motor home, as would be appreciated by one of ordinary skill in the art having the benefit of this disclosure. For example, the connectors may be, but are not limited to, magnets, straps, clamps, snaps, hook and loop, clips, and/or a combination thereof.

Figure 2:
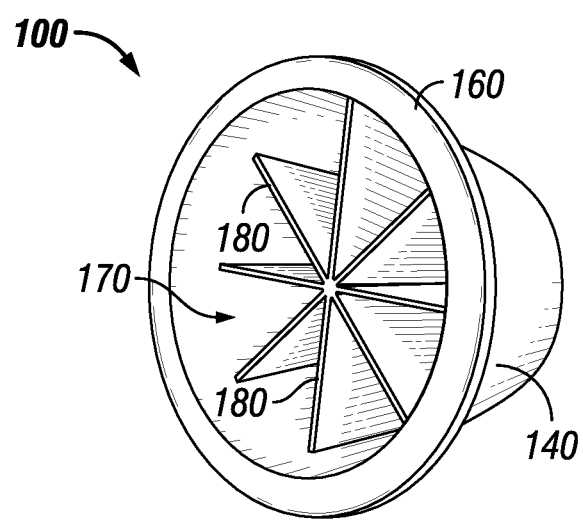
FIG. 2 shows an isometric bottom view of an embodiment of a vehicle leveler spacer.

FIG. 2 shows an isometric bottom view of an embodiment of a vehicle leveler spacer 100. The spacer 100 includes a bottom surface 160 and an internal cavity 170 that is formed by the sidewall 140 and top surface 110. The internal cavity 170 may include a plurality of structural members 180 connected to the sidewall 140. The structural members 180 may increase the supporting strength of the spacer 100. The structural members 180 as shown in FIG. 2 for illustrative purposes and the number, size, configuration, and/or location of the structural members 180 may be varied as would be appreciated by one of ordinary skill in the art having the benefit of this disclosure. Various structures may be used as supporting structures 180 within the internal cavity 170 of the spacer 100. For example, the supporting structures may comprise, but are not limited to, a honeycomb structure, beams, columns, members, arches, and/or a combination therein.

FIG. 3 shows an embodiment of a leveler spacer 100 selectively connected to a retracted trailer leveler 20 of a trailer 10. The spacer 100 may be used on retracted levelers of various vehicles having extendable levelers, such as, but not limited to, trailers, recreational vehicles, motor homes, travel trailers, fifth wheel trailers, toy haulers, tent trailers, and/or utility trailers as would be appreciated by one of ordinary skill in the art having the benefit of this disclosure. The magnets 130 (shown in FIG. 1) located at the top surface 110 (shown in FIG. 1) of the spacer 100 enable to the spacer 100 to be selectively attached to the pad 25 of the leveler 20 while the leveler 20 is still retracted. As shown in FIG. 3, the spacer 100 is connected to the leveler 20 while the leveler 20 and, thus, the attached spacer 100 are positioned above the supporting surface 1. The supporting surface 1 may comprise any surface onto which the leveler 20 may be extended onto to at least partially support the trailer 10. For example, the supporting surface 1 may be, but is not limited to, the ground, dirt, grass, a cement pad, a parking lot, a driveway, or various others surfaces as would be appreciated by one of ordinary skill in the art having the benefit of this disclosure. As shown in FIG. 3, the pad 25 may be located entirely within the rim 115 of the top surface 110 of the spacer 100.

Figure 4:
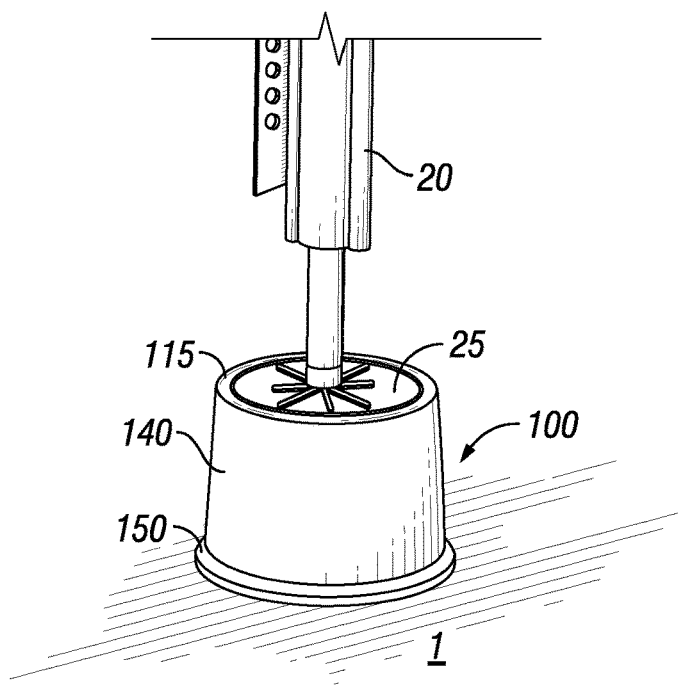
FIG. 4 shows an embodiment of a leveler spacer on the ground supporting an extended trailer leveler.

FIG. 4 shows the leveler spacer 100 selectively connected to a leveler 20 of a trailer 10 extended away from the trailer 10 until the bottom surface 160 (shown in FIG. 1) of the spacer 100 contacts the supporting surface 1, e.g. the ground. The attachment of the spacer 100 to the leveler 20 prior to extending the leveler 20 provides that the leveler 20 remain aligned with the spacer 100. As discussed herein, the spacer 100 may be selectively attached to various extendable levelers that provide support for various vehicles, such as, but not limited to, motor homes and trailers. The magnets 130 (shown in FIG. 1) located at the top surface 110 (shown in FIG. 1) of the spacer 100 enable to the quick attachment of the spacer 100 to each leveler 20 on a vehicle prior to extending the levelers 20. Likewise, the magnets 130 enable the quick removal of the spacers 100 from the levelers 20 upon retraction, for example if it is desired to move the vehicle to a different location.

Figure 5:
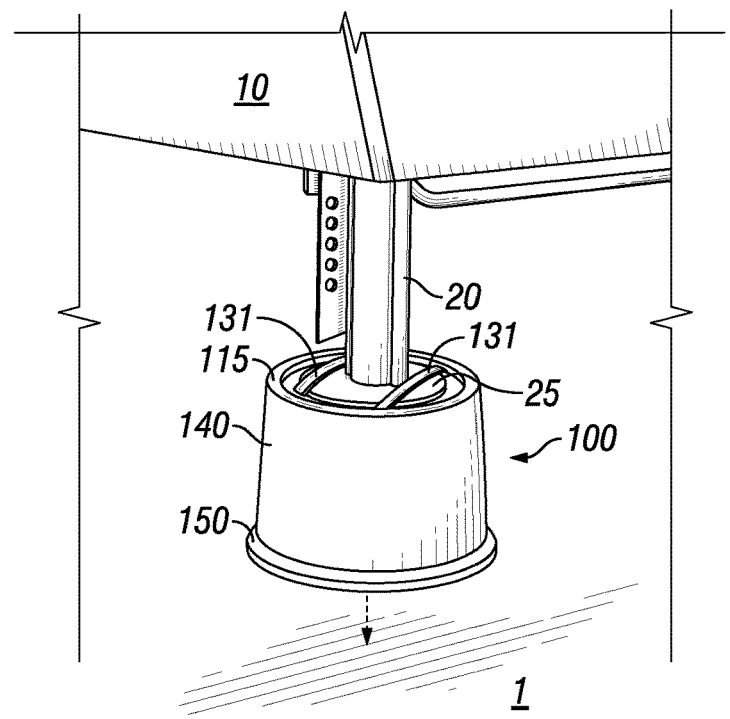
FIG. 5 shows an embodiment of a leveler spacer selectively connected to a retracted trailer leveler.

FIG. 5 shows an embodiment of a spacer 100 connected to a retracted leveler 20 of a trailer 10. As discussed herein, the spacer 100 may be used to provide support between the leveler 20 and a supporting surface 1, such as the ground, as discussed herein. The spacer 100 includes a top surface 110 (shown in FIG. 1) enclosed by a rim, or ridge, 115 configured to retain the pad 25 of the leveler 20. The spacer 100 includes a sidewall 140 that connects the top surface 110 to a bottom portion 150 of the spacer 100. The bottom portion 150 of the spacer 100 may be formed as a flange or rim that extends outward away from the sidewall 140, as shown in FIG. 5.

The spacer 100 includes at least one connector that is configured to selectively attach or connect the spacer 100 to a retracted trailer leveler 20. In other words, the at least one connector is used to attach the spacer 100 to a leveler 20 before the leveler 20 is lowered or extended to level and/or provide support for a trailer 10. In one embodiment, the connector may be at least one strap 131 configured to attach the spacer 100 to the leveler 20. The spacer 100 of FIG. 5 includes two straps 131 that may be used to selectively attach the spacer 100 to a retracted leveler 20. FIG. 5 shows two straps 131 for illustrative purposes and the number, size, location, and/or configuration of the straps 131 may be varied depending on the application as would be appreciated by one of ordinary skill in the art having the benefit of this disclosure. Alternatively, the connectors, which may be straps 131, may be located on a portion of the leveler pad 25 or leveler 20 to selectively connect the spacer 100 to a retracted leveler 20 as would be appreciated by one of ordinary skill in the art having the benefit of this disclosure.

Figure 6:
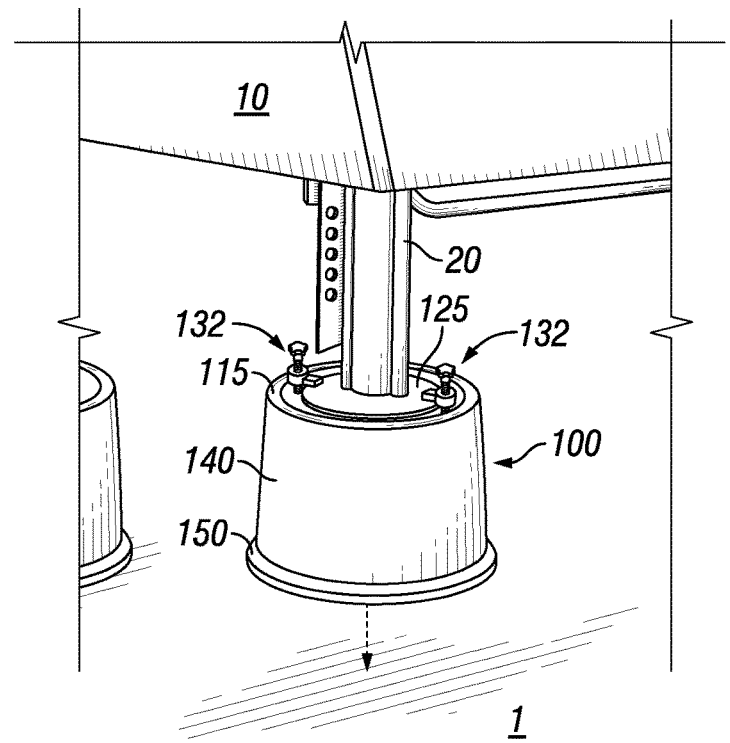
FIG. 6 shows an embodiment of a leveler spacer selectively connected to a retracted trailer leveler.

FIG. 6 shows an embodiment of a spacer 100 connected to a retracted leveler 20 of a trailer 10. As discussed herein, the spacer 100 may be used to provide support between the leveler 20 and a supporting surface 1, such as the ground, as discussed herein. The spacer 100 includes a top surface 110 (shown in FIG. 1) enclosed by a rim, or ridge, 115 configured to retain the pad 25 of the leveler 20. The spacer 100 includes a sidewall 140 that connects the top surface 110 to a bottom portion 150 of the spacer 100. The bottom portion 150 of the spacer 100 may be formed as a flange or rim that extends outward away from the sidewall 140, as shown in FIG. 6.

The spacer 100 includes at least one connector that is configured to selectively attach or connect the spacer 100 to a retracted trailer leveler 20. In other words, the at least one connector is used to attach the spacer 100 to a leveler 20 before the leveler 20 is lowered or extended to level and/or provide support for a trailer 10. In one embodiment, the connector may be at least one clamp 132 configured to attach the spacer 100 to the leveler 20. The spacer 100 of FIG. 6 includes two clamps 132 that may be used to selectively attach the spacer 100 to a retracted leveler 20. FIG. 6 shows two clamps 132 for illustrative purposes and the number, size, location, and/or configuration of the clamps 132 may be varied depending on the application as would be appreciated by one of ordinary skill in the art having the benefit of this disclosure. Alternatively, the connectors, which may be clamps 132, may be located on a portion of the leveler pad 25 or leveler 20 to selectively connect the spacer 100 to a retracted leveler 20 as would be appreciated by one of ordinary skill in the art having the benefit of this disclosure.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A leveler spacer comprising:
   a top surface;
   a rim along a perimeter of the top surface, the rim extending a distance from the top surface;
   a bottom surface;
   a sidewall connected to the top surface and the bottom surface; and
   at least one connector configured to selectively attach the leveler spacer to a retracted leveler, wherein the connector further comprises at least one magnet configured to magnetically connect the spacer to a pad of the leveler; and
   wherein a gap is formed between the bottom surface and a supporting surface when the leveler spacer is connected to a retracted leveler and wherein the leveler spacer is configured to support the leveler on the supporting surface when the leveler is extended.

2. The spacer of claim 1, wherein the rim is configured to enclose the pad of the leveler when the spacer is connected to the leveler.

3. The spacer of claim 2, wherein the connector comprises at least two magnets configured to magnetically connect the spacer to the pad of the leveler.

4. The spacer of claim 3, the top surface further comprising a circular depression substantially centrally located in the top surface.

5. The spacer of claim 4, further comprising a cavity enclosed by the sidewall between the top surface and the bottom surface and a plurality of structural members connected to the sidewall and being positioned within the cavity.

6. The spacer of claim 5, wherein the bottom surface comprises a flange that extends away from the sidewall.

7. The spacer of claim 1, wherein the connector selectively enables the spacer to be removed from a retracted leveler of a trailer to enable the trailer to be moved.

8. A leveler spacer comprising:
   a top surface;
   a rim along a perimeter of the top surface, the rim extending a distance from the top surface;

a bottom surface;
a sidewall connected to the top surface and the bottom surface;
at least one connector configured to selectively attach the leveler spacer to a retracted leveler;
wherein a gap is formed between the bottom surface and a supporting surface when the leveler spacer is connected to a retracted leveler and wherein the leveler spacer is configured to support the leveler on the supporting surface when the leveler is extended; and
wherein the connector comprises at least one strap or at least one clamp configured to selectively attach the leveler spacer to the retracted leveler.

9. A method of supporting a vehicle comprising:
connecting a spacer to a bottom of a retracted leveler, wherein a gap is created between a bottom surface of the spacer and a supporting surface, wherein connecting the spacer to the bottom of the retracted leveler further comprises magnetically connecting the spacer to the bottom of the retracted leveler; and
extending the retracted leveler until the bottom surface of the spacer is on the supporting surface, wherein the spacer is positioned between the supporting surface and the bottom of the leveler and wherein the spacer supports at least a portion of the vehicle.

10. The method of claim 9, further comprising selectively retaining a pad of the leveler on a top surface of the spacer with a rim along a perimeter of the top surface.

11. A method of supporting a vehicle comprising:
connecting a spacer to a bottom of a retracted leveler, wherein a gap is created between a bottom surface of the spacer and a supporting surface; and
extending the retracted leveler until the bottom surface of the spacer is on the supporting surface, wherein the spacer is positioned between the supporting surface and the bottom of the leveler and wherein the spacer supports at least a portion of the vehicle, wherein connecting the spacer to the bottom of the retracted leveler further comprises securing the spacer to the bottom of the retracted leveler via at least one strap or clamp.

12. A vehicle support system comprising:
a plurality of spacers, each spacer being configured to be selectively attached to a retracted leveler of a vehicle, each spacer comprising:
a top surface;
a bottom surface;
a sidewall connected to the top surface and the bottom surface; and
at least one connector configured to selectively attach each spacer to a retracted leveler of the vehicle, wherein the connector magnetically connects the spacer to the retracted vehicle leveler.

13. The system of claim 12, wherein each spacer further comprises a rim along a perimeter of the top surface, the rim extending a distance from the top surface.

14. The system of claim 12, wherein the two of the spacers may be stacked together to provide a support for a single leveler.

15. The system of claim 12, wherein the connector mechanically couples the spacer to the retracted vehicle leveler.

* * * * *